United States Patent [19]

Veenendaal

[11] 3,893,027

[45] July 1, 1975

[54] ELECTRICAL TEST PROBE
[75] Inventor: Cornelis Teunis Veenendaal, Cornelius, Oreg.
[73] Assignee: Tektronix, Inc., Beaverton, Oreg.
[22] Filed: June 10, 1974
[21] Appl. No.: 477,711

[52] U.S. Cl. .............................. 324/72.5; 324/158 P
[51] Int. Cl. ............................................. G01r 31/02
[58] Field of Search.... 324/72.5, 149, 158 F, 158 P; 401/17; 339/108 TP, 97 T

[56] References Cited
UNITED STATES PATENTS
2,668,516  2/1954  Jovanovitsch......................... 401/17
FOREIGN PATENTS OR APPLICATIONS
495,485  11/1938  United Kingdom................. 324/149

*Primary Examiner*—Alfred E. Smith
*Assistant Examiner*—Rolf Hille
*Attorney, Agent, or Firm*—George T. Noe

[57] ABSTRACT

An electrical test-lead probe having a plurality of selectable tips singularly extendible therefrom and retractable into the probe body when not in use. Selection of the tips is controlled by rotational and longitudinal movement of an outer sleeve portion of the probe body. In one rotational position of the sleeve, a first tip is exposed by longitudinal movement of the sleeve with respect to the probe body and retracted when the sleeve is moved to the first longitudinal position. When the sleeve is rotated to a second rotational position, a second tip is extended from the probe body and retracted when the sleeve is rotated back to the first rotational position.

4 Claims, 4 Drawing Figures

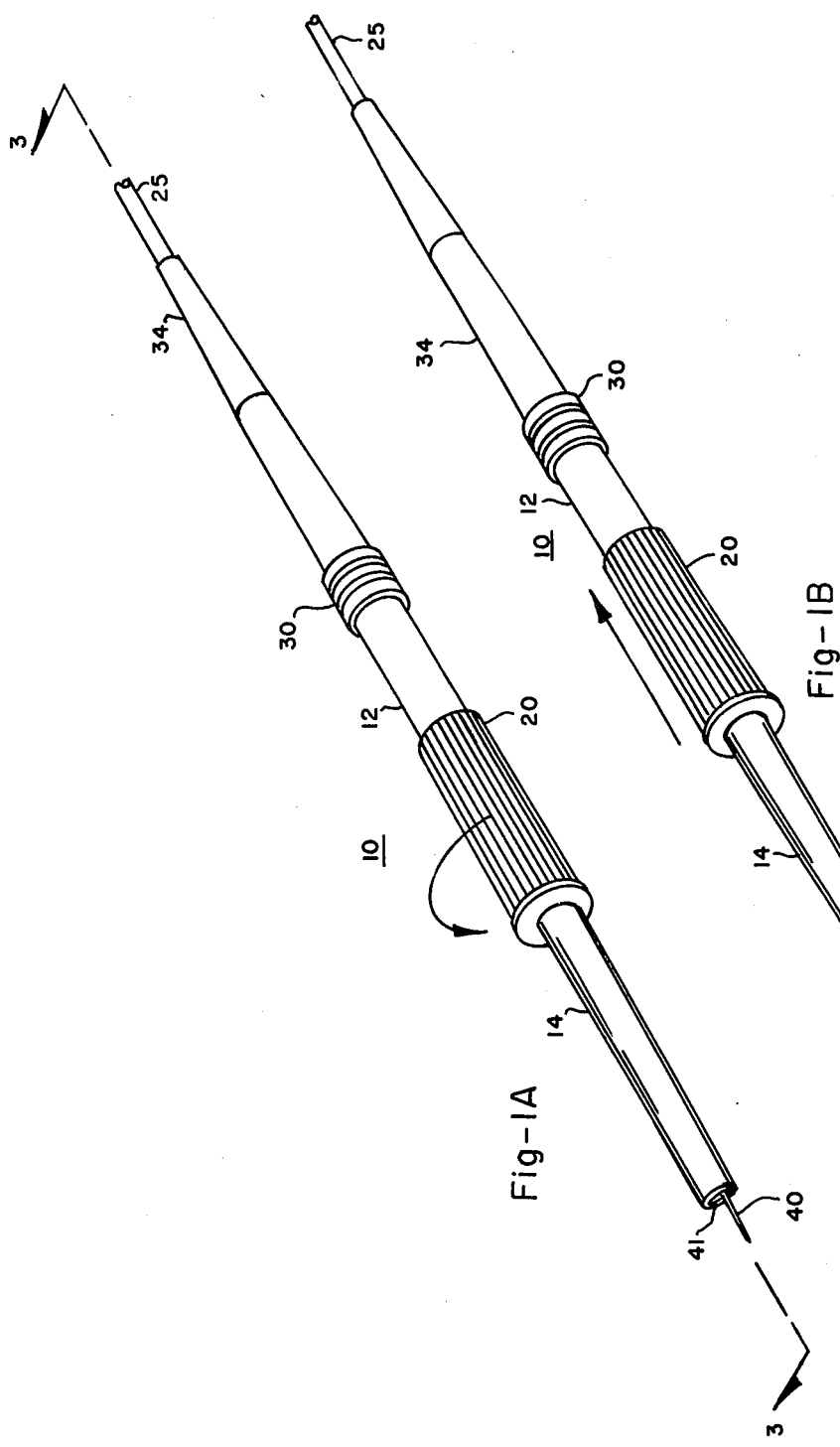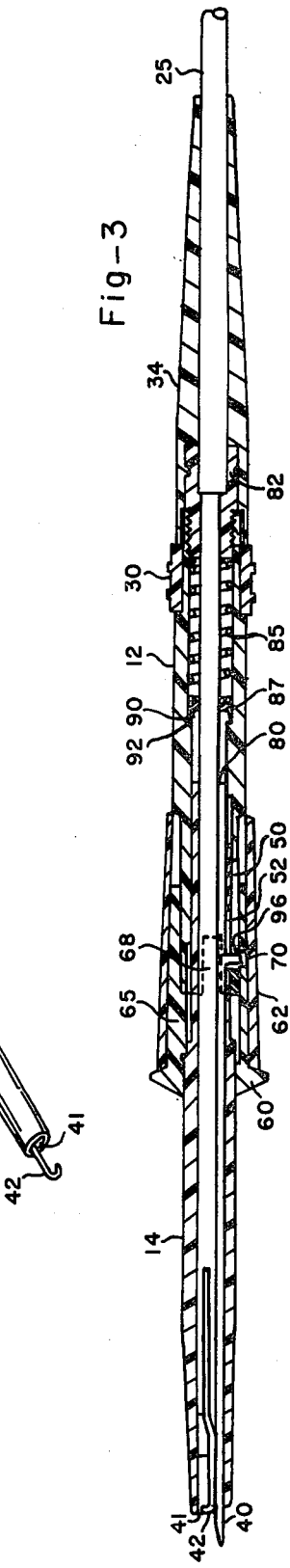

ELECTRICAL TEST PROBE

BACKGROUND OF THE INVENTION

Electrical test-lead probes provide a convenient method for connecting a signal to the input of an electronic measurement instrument such as a voltmeter or an oscilloscope, and are therefore extremely popular and widely used. To increase the versatility of such probes, it has been a practice to provide a plurality of interchangeable probe tips to permit the probe to be modified into a configuration best suited for a particular electrical connection. A major disadvantage of interchangeable tips is the loss of time incurred where many measurements are being taken and the measurement situations require different probe tips. These interchangeable tips have generally been frictional fit or screw-on types. In the case of screw-on tips, replacement can be a tedious chore. However, a major disadvantage of such interchangeable tips is that when removed from the probe body, they have the tendency to become easily lost or misplaced.

SUMMARY OF THE INVENTION

The probe according to the present invention overcomes the aforementioned disadvantages by having a plurality of tips contained within the probe body, each tip of which can be selectably extended to provide a particular electrical connection or electrical contact and then retracted into the probe body when not in use.

The probe body includes a telescoping bimembral hollow barrel of insulative material comprising a stationary member and an axially movable member which are kept in proper rotational alignment with each other by means of a key and slot. An internal spring maintains the probe body in a normally distended position on its longitudinal axis. A conductive member is affixed to the stationary probe body member and extends axially therethrough. An electrical wire is attached to one end of the conductive member, while the opposite end of the conductive member includes a tip portion thereof to be exposed when the movable probe body member is moved to a contractional position against the pressure of the internal spring.

A second probe tip is housed within the probe body, positioned parallel to the conductive member and in wiping engagement therewith to ensure good electrical contact. The second probe tip includes a tab portion thereof extending radially therefrom through a longitudinal slot in the wall of the probe body. By moving the tab in the slot, the second probe tip may be extended longitudinally from the probe body and retracted thereinto independently of the first tip on the conductive member. Additional probe tips of differing tip configurations may be provided in a similar manner.

In the preferred embodiment of the probe according to the present invention, a hook-type tip is provided at one end of the conductive member and is exposed when the movable probe body member is moved to its contractional position. This hook-type tip may be connected to point in a circuit to be tested, for example, on a wire or a test pin, and the probe body member allowed to move to its distended position, giving the hook a firm grip on the test point. A second tip having a pointed end is housed within the movable probe body and moves therewith when the second tip is retracted.

To control selection and operation of the probe tips, an outer sleeve of insulative material is disposed in concentric relationship with the movable probe body member and at least a portion of the stationary probe body member. The inner wall of the outer sleeve includes a helical slot which engages the tab on the second probe tip to urge the tip forward along the longitudinal axis to an extended position when the sleeve is rotated in one direction, and to move the tip backward to a retracted position when the sleeve is rotated in the opposite direction. A key on the inside of the outer sleeve mates with a slot in the stationary probe body member to prevent rotation of the sleeve and subsequent extension of the second probe tip when the first tip is in use. Further, this key on the inner wall of the outer sleeve prevents the movable body member from moving when the sleeve is rotated to extend the second probe tip.

It is therefore one object of the present invention to provide an electrical test probe having a plurality of selectable tips.

It is another object of the present invention to provide an electrical test probe having a plurality of tips in which the tips are retractable into the probe body when not in use.

It is a further object of the present invention to provide an electrical test probe having a plurality of selectable tips including a control mechanism to facilitate singular selection of the probe tips.

It is yet another object of the present invention to provide an electrical test probe in which probe tips may be changed with only minimal loss of time.

It is yet a further object of the present invention to provide an electrical test probe having a plurality of selectable tips in which complete insulation is provided to the point of connection.

Further objects, features, and advantages will be apparent from consideration of the following description taken in conjunction with the accompanying drawings.

DRAWINGS

FIG. 1A is a perspective view of the probe according to the present invention showing a first tip exposed in a rotational position of the outer sleeve thereof;

FIG. 1B is a perspective view of the probe showing a second tip exposed in the contractional position of the outer sleeve thereof;

FIG. 3 is a cross-sectional view of the probe taken along lines 3—3 of FIG. 1.

DETAILED DESCRIPTION

Figure 2:
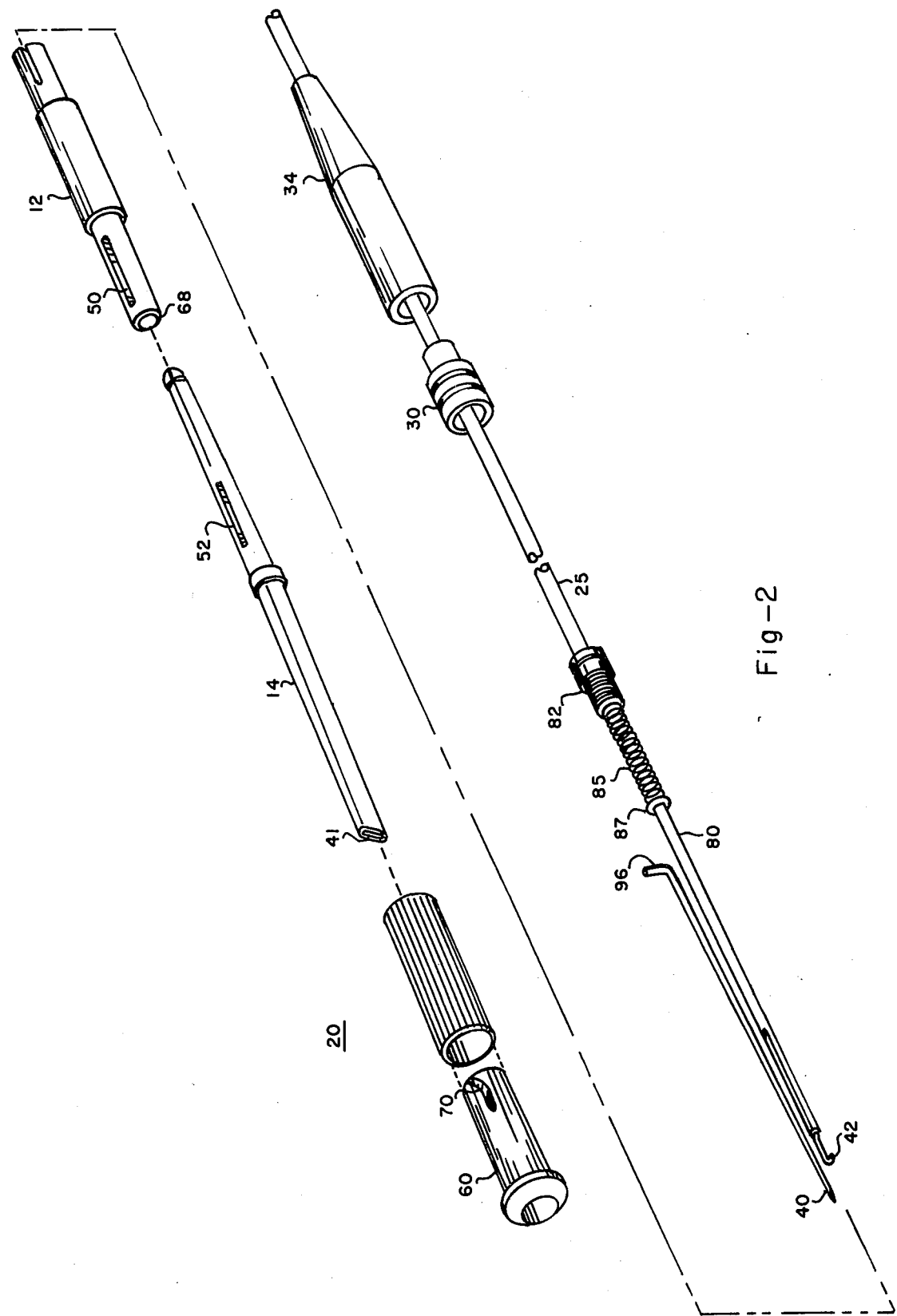
FIG. 2 is an exploded view of the probe showing the parts thereof.

In FIG. 1, a probe 10 has a hollow bimembral body consisting of stationary member 12 and movable member 14 extending through an outer control sleeve member 20. A test lead 25 of suitable length, which may be either coaxial cable or an insulated wire, is connected to an internal conductive member (not shown; to be discussed later) which is held in place by a retaining ring 30. Boot 34 fits over the test lead 25 and the end of the probe body member 12 to provide strain relief for the test lead 25.

In FIG. 1A, when control sleeve 20 is rotated, a retractable tip 40, which may be a of needle-point configuration, is extended through a slotted opening 41 in the end of the probe body member 14. The tip 40 is retracted into the probe body when the control sleeve 20 is rotated to its original position.

In FIG. 1B, when control sleeve 20 is moved longitudinally toward the rear of the probe, probe body member 14 moves relative to the stationary member 12 in a contractional relationship, exposing tip 42, which may be a hook-type tip. When the control sleeve 20 and probe body member 14 are moved to the extended position, tip 42 is covered.

The exploded perspective view in FIG. 2 and the cross-sectional view in FIG. 3 illustrate the details of the parts which form a complete unit. Parts which are common to all of the illustrations have identical reference numerals to eliminate confusion.

The bimembral probe body comprising stationary member 12 and movable member 14 fit together in a telescoping fashion with member 14 nested inside member 12 such that slot 50 is in alignment with slot 52, for reasons which will be described later. Control sleeve member 20 is rotatably mounted on movable member 14 for movement therewith, and comprises a hollow barrel 60 having a knurled outer tube member fit thereover. The inner wall of barrel 60 has a key 65 which mates with a slot 68 in the wall of stationary body member 12 in only one rotational position of control sleeve 20. Barrel 60 also has a helical slot 70 cut through its wall. The control sleeve 20 and bimembral probe body 12, 14 may be constructed of a suitable plastic, such as Delrin.

A conductive member 80 having threaded ferrule 82 attached to one end thereof is disposed inside the bimembral body 12, 14 and held in place by retaining ring 30, which fits over the end of stationary member 12 to hold a threaded inner wall portion thereof in engagement with the threads on ferrule 82. A coil spring 85 is placed over the conductive member 80 and attached at one end thereof to the ferrule 82. A washer, or bushing 87 is attached to the free end of spring 85 to urge a flanged portion 90 of movable body member 14 against an inner shoulder 92 of stationary body member 12, holding the bimembral body in the normally extended position.

A hook-type tip 42 is attached to end of the conductive member 80 so that in the extended position of the bimembral body, the tip 42 is just inside the slotted opening 41 in the end of body member 14. As can be discerned, when the control sleeve 20 is rotated such that key 65 mates with slot 68, the bimembral body can be contracted against the pressure of spring 85, exposing the tip 42 for use. When hooked to a wire or test point, the bimembral body can be allowed to distend, capturing the wire or test point between the hook-type tip 42 and the end of the probe body.

The second tip 40, which may be a sharpened conductive wire or rod, is disposed in wiping engagement with conductive member 80 inside the bimembral body. The end of the rod opposite the sharpened end may be bent to form a tab 96, which extends through the slots 52 and 50 in the bimembral body pieces 14 and 12 respectively, and into the helical slot 70 in the wall of barrel 60 of control sleeve 20. When the control sleeve 20 is rotated, helical slot 70 engages tab 96 and moves tip 40 longitudinally in and out of the slotted opening 41. In this mode of operation, the bimembral body cannot be contracted to expose the hook-type tip 42 simultaneously with tip 40 because the key 65 is not in the slot 68.

From the foregoing description, it can be discerned that each of tips 40 and 42 can be utilized independently of the other, controlled by rotational and longitudinal movement of control sleeve 20.

To complete the probe, the test lead 25 is attached to the conductive member 80 and covered with boot 34. Boot 34 may be constructed of a pliable plastic, such as vinyl, or rubber.

It will therefore be appreciated that a novel and unique electrical probe has been disclosed, and that the aforementioned and other objects have been achieved; however, it should be emphasized that the particular embodiment of the invention, which is shown and described herein, is intended as merely illustrative and not as restrictive of the invention:

I claim:

1. An electrical test probe, comprising:
an insulative body including a substantially tubular stationary member and a member disposed in internesting relationship therewith so that said body is adapted for extended and contractional dispositions;
a conductive member disposed in said body;
a plurality of probe tips disposed in said body and in contact with said conductive member, said plurality of tips including a first tip adapted to be extendible in the contractional disposition of said probe body and a second tip adapted to be extendible in the extended disposition of said probe body; and
control means for selectively extending and retracting said tips relative to said body, said control means including a sleeve member operatively connected to said movable member for selectively extending said tips by longitudinal and rotational movement thereof.

2. The probe according to claim 1 wherein said plurality of tips includes a first tip having a hook configuration connected to said conductive member and a second tip in wiping engagement with said conductive member, said control means being operatively connected to said insulative body for extending said first tip by longitudinal movement thereof and for extending said second tip by rotational movement thereof.

3. The probe according to claim 1 wherein said conductive member is attached to said stationary member and extends therethrough, said first tip is connected to said conductive member for exposure outside said probe body in the contractional disposition thereof, said second tip is disposed in wiping engagement with said conductive member and includes a projection thereon for engagement with a helical slot in said control means for exposure outside the probe body when said control means is rotated, and said control means includes interlocking means for preventing simultaneous exposure of both of said first and second tips from said probe body.

4. The probe according to claim 3 wherein said first tip has a hook configuration and second tip has a sharpened point configuration, and said probe body includes spring means disposed therein for urging said movable member into an extended disposition relative to said stationary member.

* * * * *

Disclaimer 3,893,027.—*Cornelis Teunis Veenendaal*, Cornelius, Oreg. ELECTRICAL TEST PROBE. Patent dated July 1, 1975. Disclaimer filed Jan. 30, 1978, by the assignee, *Tektronix, Inc.*

Hereby enters this disclaimer to all claims of said patent.

[*Official Gazette March 14, 1978.*]